United States Patent [19]

Kodama et al.

[11] Patent Number: 5,484,841
[45] Date of Patent: Jan. 16, 1996

[54] METHOD FOR PRODUCTION OF AQUEOUS DISPERSION OF LONG-CHAIN ALKYL GRAFT POLYMER AND AQUEOUS RELEASE AGENT

[75] Inventors: Kazuo Kodama, Yokohama; Toru Tsuda, Tokyo; Kazutomo Takahashi, Yokohama, all of Japan

[73] Assignee: Nippon Shokubai Kagaku Kogyo Co., Ltd., Osaka, Japan

[21] Appl. No.: 322,366

[22] Filed: Oct. 13, 1994

Related U.S. Application Data

[63] Continuation of Ser. No. 908,447, Jun. 30, 1992, abandoned, which is a continuation of Ser. No. 553,562, Jul. 18, 1990, abandoned.

[30] Foreign Application Priority Data

Jul. 19, 1989 [JP] Japan ................................. 1-184483
Jul. 19, 1989 [JP] Japan ................................. 1-184484

[51] Int. Cl.$^6$ .......................... C08J 3/00; C08K 3/20; C08L 39/00; C08L 75/00
[52] U.S. Cl. .................. 524/589; 524/555; 524/839; 524/840; 525/123; 528/44; 528/52; 528/68; 528/69
[58] Field of Search ........................ 525/123; 524/839, 524/840, 555, 589; 528/44, 52, 68, 69

[56] References Cited

U.S. PATENT DOCUMENTS

| 2,222,208 | 11/1940 | Ulrich | 548/96 |
|---|---|---|---|
| 2,532,011 | 11/1950 | Dahlquist et al. | 525/61 |
| 3,394,799 | 7/1968 | Dickerson et al. | 428/352 |
| 3,925,080 | 12/1975 | Postma | 96/67 |
| 4,155,892 | 5/1979 | Emmons et al. | 524/591 |
| 4,374,969 | 2/1983 | Frisch, Jr. | 528/69 |
| 4,576,987 | 3/1986 | Crockatt et al. | 524/488 |
| 4,663,377 | 5/1987 | Hombach et al. | 524/196 |
| 4,696,767 | 9/1987 | Haubennestel et al. | 252/358 |
| 4,897,261 | 1/1990 | Yamazaki et al. | 424/61 |

FOREIGN PATENT DOCUMENTS

| 4017661 | of 0000 | Japan . |
| 526385 | of 0000 | Japan . |
| 527883 | of 0000 | Japan . |

*Primary Examiner*—Paul R. Michl
*Assistant Examiner*—Patrick Niland
*Attorney, Agent, or Firm*—Burns, Doane, Swecker & Mathis

[57] ABSTRACT

A method for the production of an aqueous dispersion of a long-chain alkyl graft polymer, which method comprises mixing an aqueous solution of a polyamine with a long-chain alkyl isocyanate and stirring the resultant mixture thereby causing reaction of said component reactants, and an aqueous release agent formed therefrom.

7 Claims, No Drawings ated with heat such as paper, polyester, cellophane, and plastic films represented by OPP.

METHOD FOR PRODUCTION OF AQUEOUS DISPERSION OF LONG-CHAIN ALKYL GRAFT POLYMER AND AQUEOUS RELEASE AGENT

This application is a continuation, of application Ser. No. 07/908,447, filed Jun. 30, 1992 now abandoned, which is a continuation of application Ser. No. 07/553,562, filed Jul. 18, 1990, now abandoned.

BACKGROUND OF THE INVENTION

1. Field of the Invention

This invention relates to a method for the production of an aqueous dispersion of a long-chain alkyl graft polymer and particularly to the method of the type using a long-chain alkyl graft polymer which is formed by the reaction of a polyamine with an alkyl isocyanate. It further relates to an aqueous release agent formed of the aqueous dispersion.

1. Description of the Prior Art

As long-chain alkyl graft polymers, a polyvinyl alcohol-octadecyl isocyanate adduct [U.S. Pat. No. 2,532,011(1950)] and a polyethylene imine-octadecyl isocyanate adduct [JP-B-40-17,661(1965)] for example, which are produced by a method using an organic solvent as a reaction medium have been heretofore known.

These polymers are invariably used as dissolved in an organic solvent. Practically none of the heretofore known long-chain alkyl graft polymers can be used as diluted with water. The solvent type polymers mentioned above have a disadvantage that the organic solvent deteriorates the work environment, recovery of the used solvent is indispensable to the preclusion of the problem of environmental pollution, the price of the organic solvent itself has been rising in recent years, and the technological innovation has been encouraging switch of the conventional adhesive agents to those of the aqueous and hot melt type. In the circumstances, the desirability of developing an aqueous dispersion of a long-chain alkyl graft polymer has been finding growing recognition.

The solvent type release agents formed of the aforementioned long-chain alkyl graft polymers have been also known. Though these release agents possess excellent properties from the standpoint of quality, they require to use a large amount of an organic solvent during the work of application to a surface and, therefore, entail a step of recovering the solvent to prevent the work environment from deterioration and preclude environmental pollution. Further, the rise of the cost of organic solvent in recent years and the accelerated switch of the conventional adhesive agents to those of aqueous type and hot melt type due to the technological innovation have been urging the development of aqueous release agents.

As an aqueous release agent, a mixture of the emulsion of a copolymer of an acidic group-containing monomer and another monomer with the emulsion of octadecyl ethylene urea [JP-B-52-6,385(1977)], for example, has been known to the art. In the case of the emulsion mixture type aqueous release agent, during the step of drying subsequent to the step of application to a surface, the applied layer of the release agent must be treated at an elevated temperature to induce the reaction between the copolymer and the octadecyl ethylene urea. Thus, this release agent has a disadvantage that it is usable only on a substrate capable of withstanding the elevated temperature.

The aqueous release agents reported heretofore to the art are products obtained by severally emulsifying a long-chain alkyl possessing a functional group such as ethylene urea group, N-methylol group, or a metal salt of carboxylic acid and a polymer film-forming possessing a functional group capable of reacting with the long-chain alkyl and thereafter mixing the resultant emulsions [JP-A- 52-6,385(1977) and JP-A-52-7,883 (1977)]. These aqueous release agents must repress their reactivity to be retained stably in the form of emulsion and, nevertheless, complete the reaction of their components during a short span of time spent in the step of drying subsequent to the step of application to a surface. To fulfil these contradictory requirements, the reaction must be performed at an elevated temperature.

An object of this invention, therefore, is to provide a novel method for the production of an aqueous dispersion of a long-chain alkyl graft polymer.

Another object of this invention is to provide a novel aqueous release agent.

A further object of this invention is to provide an aqueous release agent which has no use for a heat treatment at an elevated temperature.

SUMMARY OF THE INVENTION

The objects described above are accomplished by a method for the production of an aqueous dispersion of a long-chain alkyl graft polymer, which comprises mixing an aqueous solution of a polyamine with a long-chain alkyl isocyanate and stirring the resultant mixture to induce reaction of the component compounds.

These objects are further accomplished by an aqueous release agent which is formed of an aqueous dispersion of a long-chain alkyl graft polymer obtained by mixing an aqueous solution of a polyamine with a long-chain alkyl isocyanate and stirring the resultant mixture to induce reaction of the component compounds.

In accordance with the present invention, a stable aqueous dispersion of a long-chain alkyl graft polymer can be obtained quickly at a high ratio of selectivity by causing the reaction of a polyamine with a long-chain alkyl isocyanate to proceed in water with the reaction mixture kept in the form of emulsion or suspension.

The aqueous dispersion of a long-chain alkyl graft polymer of the present invention is used as a release agent for the treatment of rear surfaces of pressure-sensitive adhesive tapes and sheets and may be otherwise used as a fluidizing agent for sizing agents, surface-treating agents, and crude oil. The release agent of this invention, in spite of the affinity thereof for water, possesses a quality equal to that of the solvent-type release agent and excels in applicability and transparency and, therefore, can be used for the treatment of pressure-sensitive adhesive tapes and sheets using a wide variety of substrates including paper, polyester, cellophane, and plastic films represented by OPP.

The aqueous release agent formed of the aqueous dispersion of a long-chain alkyl graft polymer obtained by the reaction of a polyamine with an alkyl isocyanate in water in accordance with the present invention possesses satisfactory preservability and has no use for any extra reaction otherwise required to be effected during the step of drying subsequent to the step of application to a surface and, therefore, obviates the necessity for a heat treatment at an elevated temperature. Thus, it can be used effectively on pressure-sensitive adhesive tapes and sheets using substrates such as plastic films which are incapable of withstanding a heat treatment at an elevated temperature.

It also possesses proper release property, a strong point for a long-chain alkyl type release agent, and retains an ability to allow duplicated application to a surface and an ability to permit smooth inscription of letters and figures with a writing utensil.

EXPLANATION OF THE PREFERRED EMBODIMENT

In accordance with the present invention, an aqueous dispersion of a long-chain alkyl graft polymer is obtained by stirring and mixing an aqueous solution of a polyamine with a long-chain alkyl isocyanate thereby causing the reaction of the polyamine with the long-chain alkyl isocyanate in the form of emulsion or suspension.

The polyamines which are usable in the present invention include polyalkylene imines such as polyethylene imine and polypropylene imine, polyalkylene polyamines (possessing average molecular weights in the range of 50 to 1,000,000, preferably 100 to 700,000) such as ethylene diamine, triethylene tetramine, and tetraethylene pentamine, modified polyamines such as the condensate of ethylene diamine with epichlorohydrin, and water-soluble polymeric amines such as polyvinyl amine and polyallyl amine which possess an active hydrogen capable of reacting with isocyanate, for example. The polyamine is used in the form of an aqueous solution containing the polyamine in a concentration in the range of 1 to 95% by weight, preferably 2 to 50% by weight.

The alkyl isocyanate to be used in the present invention is a monovalent isocyanate possessing an alkyl group of not less than 8 carbon atoms, preferably an alkyl group of 12 to 30 carbon atoms on account of ready availability. As examples of the alkyl isocyanate which answers the description, such long-chain alkyl isocyanate as dodecyl isocyanate, tridecyl isocyanate, tetradecyl isocyanate, pentadecyl isocyanate, hexadecyl isocyanate, octadecyl isocyanate, nonadecyl isocyanate, and eicodecyl isocyanate may be cited.

In the present invention, by adding the aforementioned alkyl isocyanate to an aqeuous solution of the aforementioned polyamine and vigorously stirring the resultant mixture, the alkyl isocyanate is emulsified or dispersed in water and enabled to react with the polyamine in the emulsified or dispersed state. In this case, for the reaction to proceed smoothly and thoroughly, it is important that the alkyl isocyanate should be sufficiently pulverized and allowed to participate in the reaction in the form of emulsion or suspension. Thus, the stirring mentioned above is preferable to be carried out by the use of a device such as a homogenizer which possesses strong shearing force. The reaction is performed at a temperature in the range of 0° to 100° C., preferably 5° to 40° C., for a period in the range of 15 minutes to several hours, preferably 30 minutes to 2 hours. Application of more heat than necessary is not preferable because it goes to accelerating the reaction of the alkyl isocyanate with water.

In this case, the alkyl isocyanate can be added in an undiluted form to the reaction system. Optionally, however, it can be added as dissolved and diluted in an organic solvent. Where the alkyl isocyanate has a melting point higher than the reaction temperature, since the alkyl isocyanate is required to participate in the reaction in a sufficiently pulverized form in water, it is preferable to be dissolved in a solvent and used in the liquid state in the reaction. The solvent used in this case is preferable to be of a type capable of freely mingling with water. The solvents which are usable herein include aromatic solvents such as benzene, toluene, and xylene, aliphatic solvents such as hexane, heptane, and ester type solvents such as ethyl acetate and butyl acetate, for example. After the reaction is completed, the solvent may be removed as occasion demands from the reaction solution.

Though the ratio of addition of the alkyl isocyanate is not particularly defined, it is preferable to be in the range of 0.2 to 1.0 mol, preferably 0.5 to 1.0 mol, per mol of the amino group of the polyamine.

When the alkyl isocyanate is to be dispersed in the aqueous solution of the polyamine, a surfactant may be used for the purpose of enabling the alkyl isocyanate to be thoroughly pulverized. Though the surfactant to be used herein is not particularly limited, it is preferable to be of a type exhibiting relatively high hydrophilicity and possessing an ability to form an O/W type emulsion during the course of emulsification. As typical examples of the surfactant, nonionic surfactants (e.g. having 10 to 20 of HLB, preferably 15 to 20 of HLB) such as polyoxyethylene nonylphenyl ether and polyoxyethylene stearyl ether, anionic surfactants such as sodium lauryl sulfate and polyoxyethylene nonylphenyl ether sodium sulfate, and cationic type surfactants such as stearyl amine acetate and stearyl trimethyl ammonium chloride may be cited. The amount of the surfactant to be used herein is in the range of 5 to 70% by weight, preferably 10 to 50% by weight, based on the amount of the alkyl isocyanate.

The aqueous dispersion of the long-chain alkyl graft polymer obtained as described above can be used as an aqueous release agent.

The aqueous release agent of the present invention can be applied with any of the conventional coating devices such as, for example, roll coaters, gravure coaters, and lip coaters. The amount of the aqueous release agent to be applied is in the range of 0.001 to 1.0 $g/m^2$, preferably 0.01 to 0.3 $g/m^2$.

The substrates on which the aqueous release agent of the present invention is applicable include films of such plastic materials as polyethylene, polypropylene, polyesters, and cellophane, sheets of paper such as quality paper, craft paper, crepe paper, and glassing paper, other similar impregnated papers, papers of filled texture such as plastic-coat paper, and sheets of cloth, for example.

When the aqueous release agent of this invention is prepared as a coating liquid for application to a plastic film of polyester, cellophane, or polypropylene, the coating liquid may incorporate therein a hydrophilic organic solvent as occasion demands. Particularly, alcohols of low molecular weights are suitable for the addition to the coating liquid. Specifically, methanol, ethanol, isopropanol, n-propanol, etc. are usable. Further, such commercially available wetting agents and settabilityimproving agents as Surfynol 465 (Nisshin Kagaku Kogyo K.K.), Byk-181 (Byk Chemie Japan K.K.), and Nopco wet SN-20T (San Nopco K.K.) are usable in the coating liquid.

Now, methods for production of typical long-chain alkyl graft polymers will be described below specifically with reference to working examples. It should be noted, however, that this invention is not limited to these examples.

EXAMPLE 1

In 75.0 g of water, 2.6 g of polyethylene imine (average molecular weight 20,000: produced by Nippon Shokubai Kagaku Kogyo Co., Ltd. and marketed under product code of "SP-300") was thoroughly dissolved. The resultant aqueous solution and 12.4 g of octadecyl isocyanate added thereto were stirred in a homogenizer as kept at 25° C. for 30 minutes, to obtain an aqueous dispersion of polyethylene imine-octadecyl isocyanate adduct.

The selectivity of the chemical addition for octadecyl isocyanate calculated in accordance with the following formula, using results of the analysis of the hydrolyzate of octadecyl isocyanate by gas chromatography, was found to be 96%.

$$ODI \text{ selectivity } (\%) = \frac{\text{Mol amount of charged } ODI - \text{Mol amount of hydrolyzed } ODI}{\text{Mol amount of charge } ODI} \times 100$$

wherein ODI is octadecyl isocyanate.

EXAMPLE 2

In 75.9 g of water, 8.7 g of polyethylene imine (available component 30% by weight; produced by Nippon Shokubai Kagaku Kogyo Co., Ltd. and marketed under product code of "P-1000") and 3.0 g of polyoxyethylene nonylphenyl ether (HLB 17.5) as a nonionic surfactant were thoroughly dissolved. The resultant aqueous solution and 12.4 g of octadecyl isocyanate added thereto were stirred in a homogenizer as kept at 25° C. for 30 minutes, to obtain an aqueous dispersion of polyethylene imine-octadecyl isocyanate adduct.

The selectivity of the chemical addition for octadecyl isocyanate calculated in the same manner as in Example 1 was found to be 95%.

EXAMPLE 1

In 69.6 g of water, 2.6 g of polyethylene imine (average molecular weight 20,000; produced by Nippon Shokubai Kagaku Kogyo Co., Ltd. and marketed under product code of "SP-300") and 3.0 g of polyoxyethylene nonylphenyl ether (HLB 17.5) as a nonionic surfactant were thoroughly dissolved. The resultant solution and a solution of 12.4 g of octadecyl isocyanate in 12.4 g of hexane added thereto were stirred in a homogenizer as kept at 25° C. for 30 minutes, to obtain an aqueous dispersion of polyethylene imine-octadecyl isocyanate adduct.

The selectivity of the chemical addition for octadecyl isocyanate calculated in the same manner as in Example was found to be 97%.

EXAMPLE 4

In 67.3 g of water, 2.1 g of polyethylene imine (average molecular weight 1,800; produced by Nippon Shokubai Kagaku Kogyo Co., Ltd. and marketed under product code of "SP-018") and 4.8 g of stearyl trimethyl ammonium chloride (solids content 63% by weight) as a cationic surfactant were thoroughly dissolved. The resultant solution and a solution of 12.9 g of octadecyl isocyanate in 12.9 g of ethyl acetate added thereto were stirred as kept at 25° C. for 30 minutes, to obtain an aqueous dispersion of polyethylene imine-octadecyl isocyanate adduct.

The selectivity of the chemical addition for octadecyl isocyanate calculated in the same manner as in Example 1 was found to be 98%.

EXAMPLE 5

In 69.3 g of water, 2.3 g of tetraethylene pentamine and 3.0 g of polyoxyethylene nonylphenyl ether (HLB 17.5) as a nonionic surfactant were thoroughly dissolved. The resultant solution and a solution of 12.7 g of octadecyl isocyanate in 12.7 g of toluene added thereto were stirred in a homogenizer as kept at 25° C. for 30 minutes, to obtain an aqueous dispersion of polyethylene imine-octadecyl isocyanate adduct.

The selectivity of the chemical addition for octadecyl isocyanate calculated in the same manner as in Example 1 was found to be 98%.

EXAMPLE 6

In 68.0 g of water, 2.8 g of polyallyl amine (average molecular weight 10,000) and 4.8 g of stearyl trimethyl ammonium chloride (solids content 63% by weight) as a cationic surfactant were thoroughly dissolved. The resultant solution and a solution of 12.2 g of octadecyl isocyanate in 12.2 g of toluene added thereto were stirred in a homogenizer as kept at 25° C. for 30 minutes, to obtain an aqueous dispersion of polyallyl amine-octadecyl isocyanate adduct.

The selectivity of the chemical addition for octadecyl isocyanate calculated in the same manner as in Example 1 was found to be 95%.

Control 1

In 69.4 g of water, 2.4 g of polyvinyl alcohol (average polymerization degree 550 and saponification degree 88.0%) and 3.0 g of polyoxyethylene nonylphenyl ether (HLB 17.5) as a nonionic surfactant we-re thoroughly dissolved. The resultant solution and a solution of 12.6 g of octadecyl isocyanate in 12.6 g of toluene added thereto were stirred in a homogenizer as kept at 25° C. for 30 minutes, to obtain an aqueous dispersion of polyvinyl alcohol-octadecyl isocyanate adduct.

The selectivity of the chemical addition for octadecyl isocyanate calculated in the same manner as in Example 1 was found to be 13%.

EXAMPLE 7

In 68.7 g of water, 1.9 g of triethylene tetramine and 3.0 g of polyoxyethylene nonylphenyl ether (HLB 17.5) as a nonionic surfactant were thoroughly dissolved. The resultant solution and a solution of 13.2 g of octadecyl isocyanate in 13.2 g of hexane added thereto were stirred in a homogenizer as kept at 25° C. for 30 minutes, to obtain an aqueous dispersion of triethylene tetramine-octadecyl isocyanate adduct.

EXAMPLE 8

In 67.5 g of water, 2.3 g of polyethylene imine (average molecular weight 10,000) and 4.8 g of stearyl trimethyl ammonium chloride (solids content 63% by weight) were thoroughly dissolved. The solution and a solution of 12.7 g of octadecyl isocyanate in 12.7 g of toluene added thereto were stirred in a homogenizer as kept at 25° C for 30 minutes, to obtain an aqueous dispersion of polyethylene imine-octadecyl isocyanate.

EXAMPLE 9

A coating liquid having an available component of 0.6% by weight was prepared by diluting the aqueous dispersion of Example 7 and it was tested for quality. The results are shown in Table 1.

EXAMPLE 10

A coating liquid having an available component of 0.6% by weight was prepared by diluting the aqueous dispersion of Example 4 with an aqueous 10% by weight isopropanol solution and tested for quality by the following method. The results are shown in Table 1.

EXAMPLE 11

A coating liquid having an available component of 0.6% by weight was prepared by diluting the aqueous dispersion of Example 8 with an aqueous 10% by weight n-propanol solution and tested for quality by the following method. The results are shown in Table 1.

EXAMPLE 12

A coating liquid having an available component of 0.6& by weight was prepared by diluting the aqueous dispersion of Example 6 with an aqueous solution containing 0.05% by weight of a wetting agent (produced by Nisshin Kagaku Kogyo K.K. and marketed under trademark designation of "Surfynol 465") and tested for quality by the following method. The results are shown in Table 1.

Control 2

A coating liquid was prepared by diluting a polyethylene imine-octadecyl isocyanate adduct with toluene to a solids content of 0.6% by weight and was tested for quality by the following method. The results are shown in Table 1.

Control 3

A coating liquid prepared by diluting a polyvinyl alcohol-octadecyl isocyanate adduct with toluene to a solids content of 0.6% by weight was tested for quality by the following method. The results are shown in Table 1.

Control 4

A coating liquid prepared by diluting polyethylene imine with an aqueous 10% by weight n-propanol solution to a solids content of 0.6% by weight was tested for quality by the following method. The results are shown in Table 1.

Control 5

As blanks, OPP, a PET film, and paper not coated with a release agent at all were tested for quality by the following method. The results are shown in Table 1.

[Method for testing release property]

A given coating liquid was applied with a bar coater on the surfaces of a biaxially stretched polypropylene (hereinafter referred to as "OPP") and polyethylene terephthalate (hereinafter referred to as "PET") sheets treated by corona discharge and on quality paper. The amount of the coating liquid applied was 0.04 g/m². The coated sheets were dried at 100° C. for 2 minutes. A rubber type adhesive tape (produced by Sekisui Chemical Co., Ltd. and marketed under trademark designation of "Orientape") was attached fast to the coated surfaces of the sheets with a roller 2 kg in weight. The sheets were cut to obtain strips of the tape's size as test pieces.

The release property was determined by preserving a given test piece at 60° C. and 85% RH for four days, separating the adhesive tape from the substrate sheet while measuring the resistance offered to the separation, and testing the released surface of the substrate sheet for residual adhesive strength. This resistance to separation was measured at a stripping speed of 300 mm/min at an angle of 90°. The residual adhesive strength was determined by applying the exposed tape of the test piece to a test panel of stainless steel and separating it at a release speed of 300 mm/min at an angle of 180° while measuring the resistance offered by the tape to the separation.

[Method for testing dilution stability]

This property was determined by diluting a given aqueous dispersion with water to an available component of 1% by weight, allowing the diluted aqueous dispersion to stand at rest in a test tube for 24 hours, and evaluating the condition of the diluted dispersion on the two-point scale, wherein ○ is perfect homogeneity through the entire volume and perfect absence of change and X is separation of the diluted dispersion into two clearly separated layers.

[Method for testing ability to allow inscription with writing utensil]

This property was tested by drawing lines with a ball-point pen using a water ink on the coated surface of the OPP film and measuring the degree to which the coated surface repelled the water ink on the following three-point scale, wherein ○ is perfect absence of repellency, Δ is slight repellency not so serious as to defy inscription, and X is heavy repellency enough to defy inscription.

TABLE 1

| | | OPP | | PET | | Paper | | Dilution stability | Ability to allow inscription with writing utensil |
|---|---|---|---|---|---|---|---|---|---|
| | Substrate | Resistance to separation (g/25 mm) | Residual adhesive strength (g/25 mm) | Resistance to separation (g/25 mm) | Residual adhesive strength (g/25 mm) | Resistance to separation (g/25 mm) | Residual adhesive strength (g/25 mm) | | |
| Example 9 | Example 7 | 260 | 580 | 300 | 530 | 320 | 390 | o | o |
| Example 10 | Example 4 | 260 | 560 | 290 | 520 | 300 | 380 | o | o |
| Example 11 | Example 8 | 280 | 550 | 310 | 540 | 330 | 400 | o | o |
| Enample 12 | Example 6 | 300 | 520 | 350 | 500 | 350 | 370 | o | o |
| Control 2 | Solvent type | 310 | 610 | 350 | 550 | 350 | 400 | x | o |
| Control 3 | Solvent type | 320 | 590 | 360 | 540 | 360 | 390 | x | Δ |
| Control 4 | PEI | * | * | * | * | * | * | o | o |
| Control 5 | Blank | 630 | 530 | 870 | 490 | * | * | — | X |

OPP: Polypropylene
PEI: Polyethylene imine
PET: Polyethylene terephthalate
*: Unmeasurable because of breakage of adhesive agent layer

What is claimed is:

1. A method for the production of an aqueous dispersion of a long-chain alkyl graft polymer, which method comprises:

preparing a mixture from an aqueous solution of a polyamine, a long-chain alkyl monovalent isocyanate and a cationic surfactant, said polyamine being selected from the group consisting of polyalkylene imines, polyalkylene polyamines, polyvinylamines and polyallylamines, the ratio of addition of said alkyl monovalent isocyanate being in the range of 0.5 to 1.0 mol equivalent, based on 1 mol of the amino group in said polyamine, said cationic surfactant being selected from the group consisting of stearyl amine acetate and stearyl trimethyl ammonium chloride and being in an amount of 5–70% by weight based on the weight of the alkyl monovalent isocyanate; and stirring the resultant mixture using a homogenizer to cause reaction of said reactants in the state of emulsion or suspension in water said alkyl monovalent isocyanate and its reaction product being thoroughly pulverized.

2. A method according to claim 1, wherein the alkyl group of said alkyl monovalent isocyanate has at least 8 carbon atoms.

3. A method according to claim 1, wherein said reaction is carried out at a temperature of 0° to 100° C.

4. A method according to claim 2, wherein said alkyl group has 12 to 30 carbon atoms.

5. An aqueous release agent formed of an aqueous dispersion of a long-chain alkyl graft polymer obtained by preparing a mixture from an aqueous solution of a polyamine, a long-chain alkyl monovalent isocyanate and a cationic surfactant, said polyamine being selected from the group consisting of polyalkylene imines, polyalkylene polyamines, polyvinylamines and polyallylamines, the ratio of addition of said alkyl monovalent isocyanate being in the range of 0.5 to 1.0 mol equivalent, based on 1 mol of the amino group in said polyamine, said cationic surfactant being selected from the group consisting of stearyl amine acetate and stearyl trimethyl ammonium chloride and being in an amount of 5–70% by weight based on the weight of the alkyl monovalent isocyanate; and stirring the resultant mixture using a homogenizer to cause reaction of said reactants in the state of emulsion or suspension in water wherein said alkyl monovalent isocyanate and its reaction product being thoroughly pulverized.

6. A release agent according to claim 5, wherein the alkyl group of said monovalent isocyanate has at least 8 carbon atoms.

7. A release agent according to claim 6, wherein said alkyl group has 12 to 30 carbon atoms.

* * * * *

UNITED STATES PATENT AND TRADEMARK OFFICE
CERTIFICATE OF CORRECTION

PATENT NO.   : 5,484,841
DATED        : January 16, 1996
INVENTOR(S)  : Kazuo KODAMA et al It is certified that error appears in the above-indentified patent and that said Letters Patent is hereby corrected as shown below:

In Column 5, line 36, delete "EXAMPLE 1" and insert -- EXAMPLE 3 --.

In Column 6, line 32, delete "we-re" and insert -- were --.

Signed and Sealed this

Twenty-sixth Day of March, 1996

Attest:

BRUCE LEHMAN

*Attesting Officer*     *Commissioner of Patents and Trademarks*